United States Patent
Tu et al.

(10) Patent No.: US 12,507,570 B2
(45) Date of Patent: Dec. 23, 2025

(54) DISPLAY PANEL AND DISPLAY DEVICE

(71) Applicant: TCL China Star Optoelectronics Technology Co., Ltd., Guangdong (CN)

(72) Inventors: Siyang Tu, Guangdong (CN); Hangchuan Zhang, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 388 days.

(21) Appl. No.: 17/994,421

(22) Filed: Nov. 28, 2022

(65) Prior Publication Data
US 2024/0114744 A1 Apr. 4, 2024

(30) Foreign Application Priority Data
Sep. 29, 2022 (CN) .......................... 202211199787.X

(51) Int. Cl.
*H10K 59/50* (2023.01)
*G02F 1/153* (2006.01)
*H10K 50/14* (2023.01)

(52) U.S. Cl.
CPC ............ *H10K 59/50* (2023.02); *G02F 1/153* (2013.01); *H10K 50/14* (2023.02)

(58) Field of Classification Search
CPC ........ H10K 59/50; H10K 50/14; H10K 59/35; G02F 1/153; G02F 1/1533; G02F 1/155; G02F 1/157
See application file for complete search history.

(56) References Cited

U.S. PATENT DOCUMENTS

| | | | |
|---|---|---|---|
| 10,128,321 B2 | 11/2018 | Li et al. | |
| 12,402,504 B2 | 8/2025 | Jeon et al. | |
| 2011/0199666 A1 | 8/2011 | Chun et al. | |
| 2021/0191213 A1* | 6/2021 | Liu | G02F 1/163 |

FOREIGN PATENT DOCUMENTS

| | | |
|---|---|---|
| CN | 105182652 | 12/2015 |
| CN | 106057856 | 10/2016 |
| CN | 106972042 | 7/2017 |
| KR | 10-2007-0001653 | 1/2007 |

OTHER PUBLICATIONS

Notification of Office Action and Search Report Dated Aug. 28, 2025 From The State Intellectual Property Office of the People's Republic of China Re. Application No. 202211199787.X and Its Translation Into English. (20 Pages).

* cited by examiner

*Primary Examiner* — Mohammad A Rahman

(57) ABSTRACT

A display panel and a device are provided. The display panel includes a transparent pixel layer and a pixelated electrochromic layer. The transparent pixel layer includes a plurality of pixel light-emitting regions. The pixelated electrochromic layer is disposed under the transparent pixel layer, the pixelated electrochromic layer includes a plurality of electrochromic regions, and the plurality of pixel light-emitting regions and the plurality of electrochromic regions are arranged in one-to-one correspondences. At least one of the plurality of electrochromic regions in the pixelated electrochromic layer can be switched between a transparent state and a black state.

19 Claims, 3 Drawing Sheets

DISPLAY PANEL AND DISPLAY DEVICE

CROSS-REFERENCE TO RELATED PATENT APPLICATION

This application claims the benefit of priority of Chinese Patent Application No. 202211199787.X filed on Sep. 29, 2022, the contents of which are incorporated by reference as if fully set forth herein in their entirety.

FIELD OF DISCLOSURE

The present disclosure relates to the field of display technology, and more particularly, to a display panel and a display device.

BACKGROUND OF DISCLOSURE

Currently, transparent light-emitting diode (LED) display devices, including organic-LEDs (OLED), min-LED, and micro-LED display devices, are manufactured through forming LED display devices on a transparent substrate, and then increasing distances among pixels of LEDs, and arranging transparent opening regions, so as to achieve a macroscopically transparent display effect. Generally, for an LED display device, turning off an LED pixel can display black, but for a transparent LED display device, turning off the LED pixel displays a transparent state, and black display cannot be achieved.

SUMMARY

The present application provides a display panel and a display device, so as to solve a problem of a conventional transparent display panel unable to display black.

On one hand, the present application provides a display device including:
- a transparent pixel layer including a plurality of pixel light-emitting regions; and
- a pixelated electrochromic layer is disposed under the transparent pixel layer, wherein the pixelated electrochromic layer includes a plurality of electrochromic regions, the plurality of pixel light-emitting regions and the plurality of electrochromic regions are arranged in one-to-one correspondences.

At least one of the plurality of electrochromic regions is capable of being switched between a transparent state and a black state.

In some possible embodiments, when any one of the plurality of electrochromic regions serves as a target electrochromic region, an orthographic projection area of the target electrochromic region on the transparent pixel the layer is greater than or equal to an area of a target pixel light-emitting region corresponding to the target electrochromic region.

In some possible embodiments, the target pixel light-emitting region includes a target transparent pixel region and a target transparent opening region, and the orthographic projection area of the target electrochromic region on the transparent pixel layer is greater than or equal to an area of the target transparent pixel region and the target transparent opening region.

In some possible embodiments, a distance in a horizontal direction between any two adjacent pixel light-emitting regions of the plurality of pixel light-emitting regions is greater than or equal to 20 micrometers.

In some possible embodiments, the pixelated electrochromic layer includes an electrochromic layer, an ion transport layer, and an ion storage layer that are stackedly arranged. The ion transport layer is configured for transporting ions and blocking electrons from passing through.

In some possible embodiments, the pixelated electrochromic layer further includes a first transparent substrate, a first thin-film transistor layer, a first planarization layer, and a first pixel electrode that are stackedly arranged.

The first pixel electrode layer is disposed under the electrochromic layer, the first pixel electrode layer partially covers the first planarization layer, and the electrochromic layer completely covers the first pixel electrode layer and covers a portion of the first planarization layer.

In some possible embodiments, the ion transport layer is made of solid electrolyte material.

In some possible embodiments, the pixelated electrochromic layer further includes a second transparent substrate, a second thin-film transistor layer, a second planarization layer, and a second pixel electrode layer that are stackedly arranged.

The second pixel electrode layer is disposed under the electrochromic layer, and the second pixel electrode layer partially covers the second planarization layer; the electrochromic layer is a patterned electrochromic layer, and the patterned electrochromic layer completely covers the second pixel electrode layer.

The ion transport layer completely covers the electrochromic layer and partially covers the second planarization layer; the ion transport layer is capable of transporting ions and blocking electrons from passing through.

In some possible embodiments, the ion transport layer is a liquid electrolyte material or a gel electrolyte material.

In some possible embodiments, the electrochromic layer is made of an inorganic electrochromic material.

In some possible embodiments, the electrochromic layer is made of tungsten oxide.

In some possible embodiments, the ion storage layer is made of metal oxide.

In some possible embodiments, the display panel further including a first common electrode layer, an interlayer, and a third transparent substrate that stackedly arranged. The first common electrode layer is arranged above the ion storage layer, and the third transparent substrate is connected to the first common electrode layer through the interlayer.

In some possible embodiments, the pixelated electrochromic layer includes a fourth transparent substrate, a third thin-film transistor layer, a third planarization layer, and a third pixel electrode layer that are stackedly arranged.

The third pixel electrode layer is disposed above the third planarization layer, and the third pixel electrode layer partially covers the third planarization layer;

The display panel further includes a photoresist layer, the photoresist layer is disposed above the third pixel electrode layer and covers a portion of the third pixel electrode layer, and the photoresist layer is defined with an opening above the third pixel electrode layer to expose a portion of the third pixel electrode layer.

In some possible embodiments, the electrochromic layer is made of an organic electrochromic material.

In some possible embodiments, the electrochromic layer is made of polythiophene, polyaniline, or polypyrrole.

In some possible embodiments, the pixelated electrochromic layer further includes an organic electrochromic layer and an ion transport layer, the organic electrochromic layer is filled in the opening on the photoresist layer, the ion transport layer is disposed above the organic electrochromic layer, and the ion transport layer completely covers the organic electrochromic layer and the photoresist layer.

In some possible embodiments, the display panel further includes a second common electrode layer disposed above the ion transport layer, and a fifth transparent substrate disposed above the second common electrode layer.

On another hand, the present application further provides a display device, and the display device includes the display panel as described in any of the above embodiments.

The present application provides a display panel and a display device. The display panel includes the transparent pixel layer and the pixelated electrochromic layer. The transparent pixel layer includes the plurality of pixel light-emitting regions. The pixelated electrochromic layer is disposed under the transparent pixel layer, the pixelated electrochromic layer includes the plurality of electrochromic regions, and the plurality of pixel light-emitting regions and the plurality of electrochromic regions are arranged in the one-to-one correspondences. At least one of the plurality of electrochromic regions in the pixelated electrochromic layer can be switched between the transparent state and the black state. The present application ensures that an entire display panel can be transparent while achieving black display for each single pixel while blocking incident ambient light, thereby significantly enhancing a contrast ratio of a transparent display panel and an image display effect under low gray scale.

BRIEF DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

DETAILED DESCRIPTION OF PRESENT EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

In the description of the present application, it should be explained that the terms "center", "portrait", "transverse", "length", "width", "thickness", "upper", "lower", "front", the directions or positional relationships indicated by "back", "left", "right", "vertical", "horizontal", "top", "bottom", "inside", "outside", etc. are based on the drawings. The orientation or positional relationship is only for the convenience of describing the present application and simplifying the description, and does not indicate or imply that the device or element referred to must have a specific orientation, or a structure or an operation in a specific orientation, and should not be viewed as limitations of the present application. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

The word "exemplary" is used herein to mean "serving as an example, instance, or illustration." Any embodiment or design described herein as "exemplary" is not necessarily to be construed as preferred or advantageous over other embodiments or designs. The following descriptions are presented to enable any person skilled in the art to make and use the invention. Descriptions of specific embodiments and inventions are provided only as examples. Various modifications and combinations of the examples described herein will be readily apparent to those skilled in the art, and the general principles defined herein can be applied to other examples and inventions without departing from the spirit and scope of the invention. Thus, the present invention is not intended to be limited to the examples described and shown, but is to be accorded the widest scope consistent with the principles and features disclosed herein.

A display panel and a display device are provided by embodiments of the present application, and will be described in detail in the followings.

Figure 1:
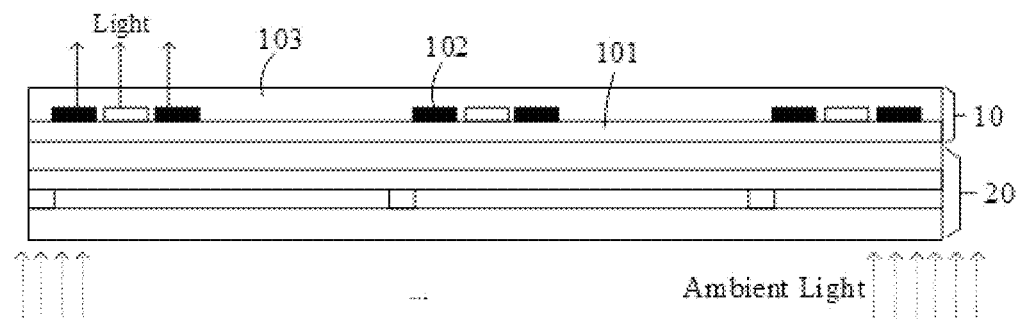
FIG. 1 is a cross-sectional schematic view of a display device provided by an embodiment of the present application.

Referring to FIG. 1, which is a cross-sectional schematic view of a display device provided by an embodiment of the present application. In the embodiment shown in FIG. 1, the display panel can include: a transparent pixel layer 10 and a pixelated electrochromic layer 20.

The transparent pixel layer 10 includes a plurality of pixel light-emitting regions.

The pixelated electrochromic layer 20 is disposed under the transparent pixel layer 10, the pixelated electrochromic layer 20 includes a plurality of electrochromic regions, and the plurality of pixel light-emitting regions and the plurality of electrochromic regions are arranged in one-to-one correspondences.

At least one of the plurality of electrochromic regions in the pixelated electrochromic layer 20 can be switched between a transparent state and a black state.

In the display panel provided by embodiments of the present application, the display panel includes a pixel layer and a pixelated electrochromic layer disposed under the pixel layer. The pixel layer includes a plurality of pixel light-emitting regions, and the pixelated electrochromic layer includes a plurality of electrochromic regions that are arranged in one-to-one correspondences with the plurality of pixel light-emitting regions. The plurality of electrochromic regions can be switched between a transparent state and a black state, so as to control ambient light entering the plurality of pixel light-emitting regions. The present application ensures that an entire display panel can be transparent while achieving black display for each single pixel while blocking incident ambient light, thereby significantly enhancing a contrast ratio of a transparent display panel and an image display effect under low gray scale.

In the embodiment shown in FIG. 1, specifically, the transparent pixel layer 10 can be a multi-layer structure, and can specifically include a fourth thin-film transistor layer 101, a pixel layer 102, and an encapsulation layer 103. The fourth thin-film transistor layer 101 is disposed above the pixelated electrochromic layer 20.

The pixel layer 102 is disposed above the fourth thin-film transistor layer 101, and the pixel layer 102 includes a plurality of transparent pixels.

The encapsulation layer 103 is disposed above the pixel layer 102 and completely covers the fourth thin-film transistor layer 101 and the pixel layer 102.

The fourth thin-film transistor layer 101 includes a plurality of thin-film transistors, and the pixel layer 102 includes the plurality of transparent pixels of different colors, so as to achieve a display of color images. The encapsulation layer 103 is disposed at a top of the entire display panel for blocking water vapor and protecting the display panel.

The pixelated electrochromic layer 20 is also a multi-layer structure, and specifically can include a transparent lower substrate, an electrochromic layer, a thin-film transistor layer and a transparent upper substrate stacked from bottom to top.

Figure 2:
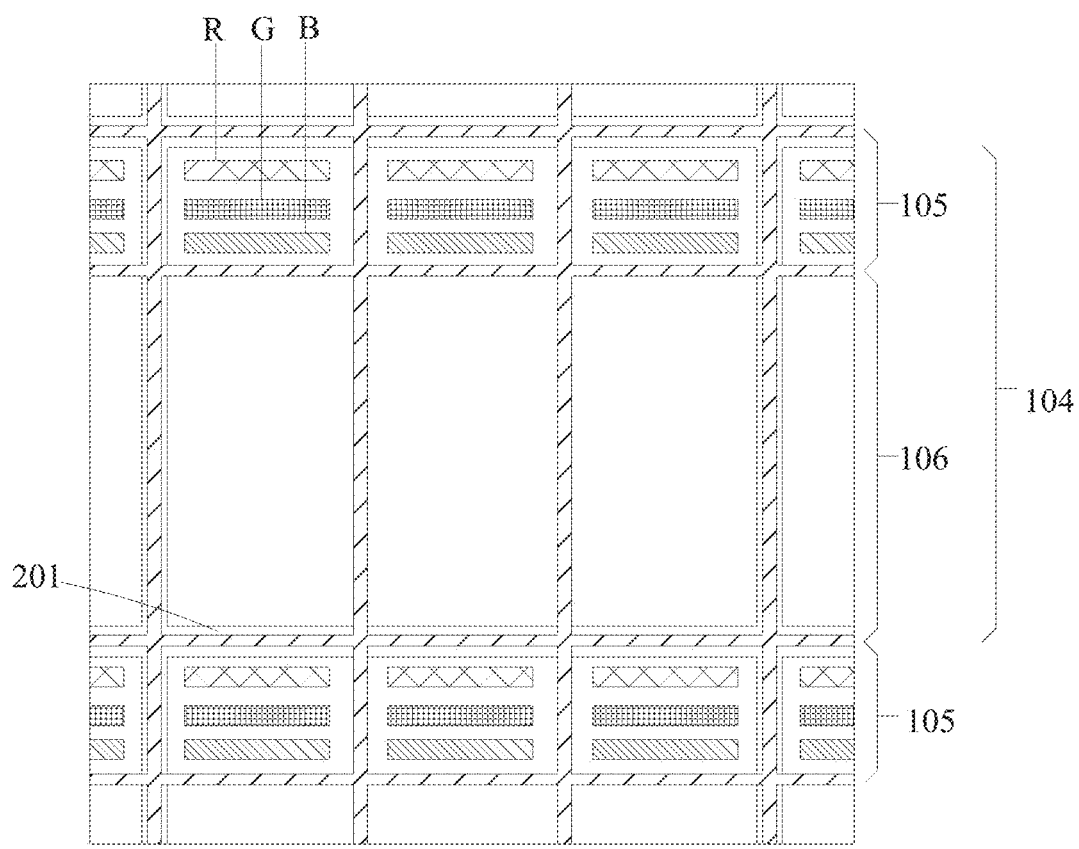
FIG. 2 is a planar schematic view of the display device provided by an embodiment of the present application.

As shown in FIG. 2, FIG. 2 is a planar schematic view of the display device provided by an embodiment of the present application. In the embodiment shown in FIG. 2, the transparent pixel layer 10 in the display panel can include a plurality of pixel light-emitting regions 104, and each of the pixel light-emitting regions 104 can include a plurality of transparent sub-pixels. Specifically, each of the pixel light-emitting regions 104 can include three red, green, and blue (RGB) transparent sub-pixels that are arranged at intervals.

The pixelated electrochromic layer 20 includes a plurality of electrochromic regions 201, and the fourth thin-film transistor layer 101 includes a plurality of transistor driving regions (not shown in the figure). As shown in FIG. 2, the plurality of electrochromic regions 201 are arranged in one-to-one correspondences with the plurality of transistor driving regions, and the plurality of electrochromic regions 201 are also arranged in one-to-one correspondences with the plurality of pixel light-emitting regions 104. When any one of the plurality of electrochromic regions 201 serves as a target electrochromic region, an orthographic projection area of the target electrochromic region on the transparent pixel layer 10 is greater than or equal to an area of a target pixel light-emitting region corresponding to the target electrochromic region. In the schematic view shown in FIG. 2, the orthographic projection area of the one of the plurality of electrochromic regions 201 located below is slightly larger than the area of the target pixel light-emitting region located above the one of the plurality of electrochromic regions 201, so that only a portion of the electrochromic region 201 is exposed. In addition, the described embodiments shown in FIG. 2 are for illustration only.

In addition, in the embodiment shown in FIG. 2, any one of the plurality of pixel light-emitting regions 104 specifically includes a transparent pixel region 105 and a transparent opening region 106. The pixel region 105 is a region including RGB sub-pixels. In some other embodiments, the pixel region 105 can also be a region including red, green, blue, and white (RGBW) sub-pixels. The transparent opening region 106 is a transparent structure, which facilitates light to pass therethrough. The orthographic projection area of the target electrochromic region on the transparent pixel layer 10 is greater than or equal to the area of the target pixel light-emitting region corresponding to the target electrochromic region. Specifically, the orthographic projection area of the target electrochromic region on the transparent pixel layer 10 is greater than or equal to a sum of an area of the target pixel region and an area of the target transparent opening region of the target pixel light-emitting region corresponding to the target electrochromic region.

In the embodiment of the present application, FIG. 1 and FIG. 2 are respectively a cross-sectional view and a top view of a same region. The plurality of pixel light-emitting regions in the transparent pixel layer 10 can be the transparent pixel region 105 and the transparent opening region 106 as shown in FIG. 2. However, since the plurality of electrochromic regions 201 are disposed below the plurality of pixel light-emitting regions, the plurality of electrochromic regions 201 are partially blocked by the plurality of pixel light-emitting regions and are only partially visible from the top, as shown in FIG. 2. It should be noted that, in the display panel provided by the embodiments of the present application, a distance in a horizontal direction between any two adjacent pixel light-emitting regions of the plurality of pixel light-emitting regions is greater than or equal to 20 micrometers.

In the embodiment of the present application, the pixelated electrochromic layer 20 can be switched between a transparent state and a black state. When the pixelated electrochromic layer 20 is in the transparent state, light can pass through the pixelated electrochromic layer 20. When the pixelated electrochromic layer 20 is in the black state, light is blocked from passing through. In the prior art, in a case of the ambient light being strong, the ambient light incident from an opposite side of a light-emitting side of the display panel is mixed with light emitted by the pixel light-emitting regions through the transparent opening region and received by human eyes, thereby reducing a contrast ratio of a display. For some low grayscale images, a contrast ratio of images themselves is low, which are difficult to be seen in a strong light environment. At this time, the pixel electrochromic layer can be turned into black to block the ambient light incident from a back of the display panel, thereby enhancing the contrast ratio of the images of the transparent pixel layer and the display effect of the low grayscale images.

Figure 3:
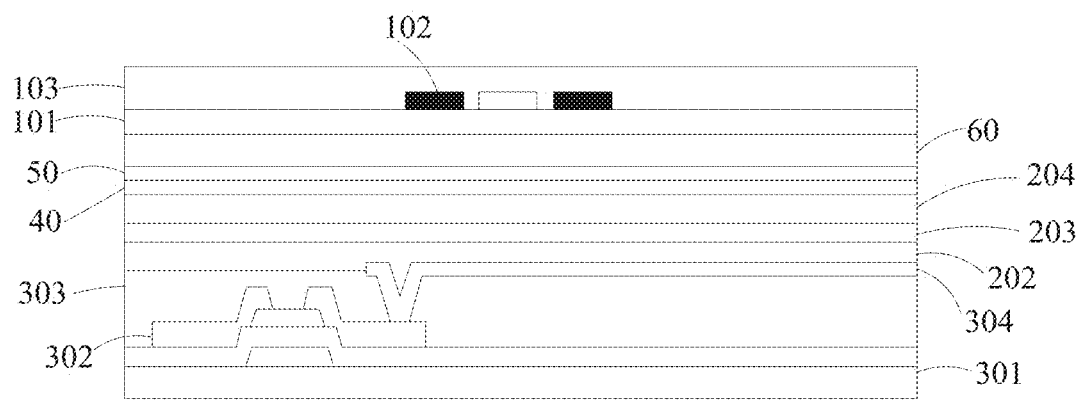
FIG. 3 is a structural schematic view of a display device provided by another embodiment of the present application.

However, in the embodiment of the present application, having practicability of practical processes considered, the transparent pixel layer 10 and the pixelated electrochromic layer 20 can be manufactured separately and then adhered to each other, which will be described separately below. As shown in FIG. 3, FIG. 3 is a structural schematic view of a display device provided by another embodiment of the present application. As shown in FIG. 3, the display panel also includes the transparent pixel layer 10 and the pixelated electrochromic layer 20 that are sequentially stacked from bottom to top. The pixelated electrochromic layer 20 can include an electrochromic layer 202, an ion transport layer 203, and an ion storage layer 204 which are sequentially stacked from bottom to top. The ion transport layer 203 can transport ions and block electrons from passing through.

In a specific embodiment, the electrochromic layer 202 can be made of an inorganic electrochromic material. More specifically, the inorganic electrochromic material can be tungsten oxide ($WO_x$), the ion transport layer 203 can be a solid electrolyte containing lithium ions, and the ion storage layer 204 can be made of nickel oxide ($NiO_x$) material.

In the above embodiment, the ion transport layer 203 is a solid electrolyte material containing lithium ions. For solid electrochromic materials, under an action of an external electric field, lithium ions in the ion transport layer 203 are embedded into the electrochromic layer 202, so that the electrochromic layer 202 switches from the transparent state to the black state; and when the lithium ions are extracted from the electrochromic layer 202 and embedded in the ion storage layer 204, the electrochromic layer 202 switches from the black state to the transparent state. The ion storage layer 204 serves a role of storing the lithium ions that are extracted. The ion transport layer 203 is disposed between the electrochromic layer 202 and the ion storage layer 204 to serve as a transport channel for the lithium ions while preventing electrons from passing through.

In the embodiment shown in FIG. 3, the pixelated electrochromic layer 20 can further include a first transparent substrate 301, a first thin-film transistor layer 302, a first planarization layer 303, and a first pixel electrode layer 304 which are stackedly arranged. The first pixel electrode layer 304 can be a transparent pixel electrode layer to facilitate light transmission. Moreover, the first pixel electrode layer 304 does not completely cover the first planarization layer 303, but exposes a portion of the first planarization layer 303. At the same time, when the first planarization layer 303 is manufactured, a groove is formed on the first planarization layer 303, so that when the first pixel electrode layer 304 is manufactured, a material of the first pixel electrode layer is filled in the first planarization layer 303 in the groove thereon. A groove is also formed on the first pixel electrode layer 304 that is manufactured, so that when the electrochromic layer 202 is manufactured on the first pixel electrode layer 304, a material of the electrochromic layer 202 is filled in the first pixel electrode layer 304. At the same time, the electrochromic layer 202 also covers a portion of the first planarization layer 303 that is not covered by the first pixel electrode layer 304. That is to say, the electrochromic layer 202 not only covers the first pixel electrode layer 304, but also covers a portion of the first planarization layer 303.

In the above-mentioned embodiment, the display panel can further include a first common electrode layer 40 disposed above the ion storage layer 204, and the first common electrode layer 40 and the first pixel electrode layer 304 can be made of a same material, specifically, can both be made of transparent inorganic conductive materials, the first common electrode layer 40 and the first pixel electrode layer 304 that are manufactured are also transparent structures so that light can pass through.

The display panel further includes an interlayer 50 disposed above the first common electrode layer 40 and a third transparent substrate 60 disposed above the interlayer 50. The third transparent substrate 60 is connected to the first common electrode layer 40 through the interlayer 50.

In the embodiment shown in FIG. 3, when the display panel is manufactured, the transparent pixel layer 10 and the pixelated electrochromic layer 20 can be arranged separately and then adhered to each other. Specifically, for the embodiment shown in FIG. 3, the first thin-film transistor layer 302 in the pixelated electrochromic layer 20 with pixelated electrodes can be manufactured through a common photolithography process. Moreover, physical vapor deposition (PVD) method can be utilized to form the electrochromic layer 202, the ion transport layer 203, and the ion storage layer 204 in sequence on the first thin-film transistor layer 302. Finally, an entire pixelated electrochromic layer 20 is encapsulated by a lamination process. At the same time, the transparent pixel layer 10 and the pixelated electrochromic layer 20 that are manufactured are laminated to obtain the display panel provided by embodiments of the present application.

It should be noted that, in the embodiment shown in FIG. 3, when a voltage is applied to the first pixel electrode layer 304, only a portion of the pixelated electrochromic layer 20 directly above the first pixel electrode layer 304 will be switched between the transparent state and the black state. This is because ions move relatively slowly in a solid electrolyte material, so that the lithium ions only move in a vertical electric field formed between the first pixel electrode layer 304 and the first common electrode layer 40, and diffusing to areas outside the vertical electric field is difficult.

Certainly, in a practical display panel, the pixelated electrochromic layer 20 that is switched is not entirely an orthographic projection area corresponding to the first pixel electrode layer 304, and the pixelated electrochromic layer 20 that is switched includes the orthographic projection area corresponding to the pixel electrode layer 304, and an area where an orthographic projection diffuses outward and a distance of diffusion is less than 20 micrometer (μm). This is because although it is difficult for lithium ions to diffuse to the area outside a range of the vertical electric field, practically, in the display panel, lithium ions still diffuse to a certain extent, but with a relatively small diffusion range. Therefore, when designing a plurality of pixels, a distance between any two adjacent pixels is required to be greater than a cross-sectional distance of the first pixel electrode layer in the horizontal direction added with a distance of 20 μm on to the left and to the right. In this way, the plurality of pixels do not interfere one another.

Figure 4:
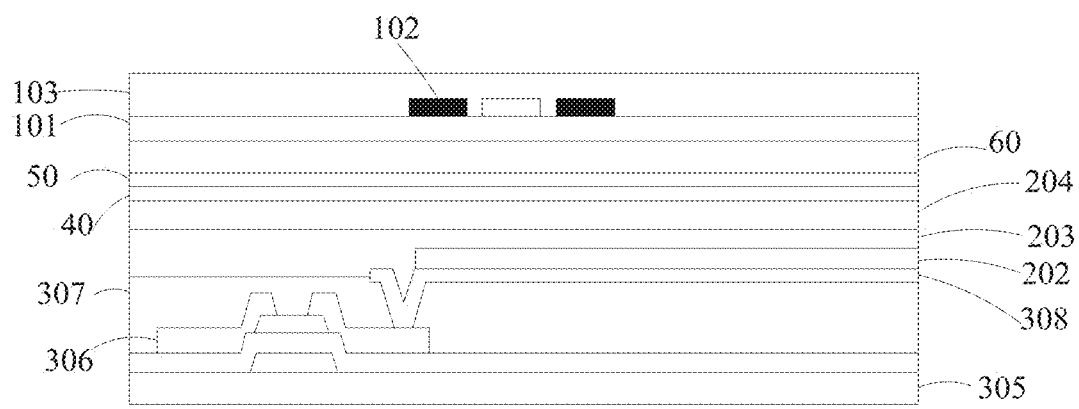
FIG. 4 is a structural schematic view of a display device provided by yet another embodiment of the present application.

As shown in FIG. 4, FIG. 4 is a structural schematic view of a display device provided by yet another embodiment of the present application. In the embodiment shown in FIG. 4, the display panel also includes the transparent pixel layer 10 and the pixelated electrochromic layer 20. The pixelated electrochromic layer 20 further includes a second transparent substrate 305, a second thin-film transistor layer 306, a second planarization layer 307, and a second pixel electrode layer 308 that are sequentially stacked from bottom to top. The pixelated electrochromic layer 20 further includes the electrochromic layer 202, the ion transport layer 203, and the ion storage layer 204 that are sequentially stacked from bottom to top. The ion transport layer 203 can transport ions and block electrons from passing through. In the embodiment of the display panel shown in FIG. 4, the display panel also includes the first common electrode layer 40, the interlayer layer 50, and the third transparent substrate 60 that are stackedly arranged.

Referring to FIG. 3 and FIG. 4, for the embodiments shown in FIG. 3 and FIG. 4, both of the pixelated electrochromic layers 20 include the (first/second) transparent substrates, the (second/third) thin-film transistor layers, the (first/second) planarization layer, and the (first/second) pixel electrode layer that are stackedly arranged. In addition, the pixelated electrochromic layers 20 each includes the electrical layer, the ion transport layer, and the ion storage layer. However, unlike the embodiment shown in FIG. 3, in the embodiment shown in FIG. 4, the electrochromic layer 202 that is patterned only covers the second pixel electrode layer 308 and does not cover a portion of the second planarization layer 307 that is not covered by the first pixel electrode layer 304. As shown in FIG. 4, after the electrochromic layer 202 is manufactured, a portion of the second planarization layer 307 is still exposed. In the embodiment shown in FIG. 3, the electrochromic layer 202 is required to cover the first pixel electrode layer 304 while exposing a portion of the first planarization layer 303.

In the embodiment shown in FIG. 4, the electrochromic layer 202 is a patterned electrochromic layer; while in the embodiment shown in FIG. 3, the electrochromic layer 202 is not required to be patterned.

Therefore, in the embodiment shown in FIG. 4, the second thin-film transistor layer 306 is required to be manufactured in advance, and the patterned electrochromic layer 202 partially covering the second thin-film transistor layer 306 (i.e., only covering the second pixel electrode layer 308) is manufactured on the second thin-film transistor layer 306 through the PVD method. An entire ion storage layer 204 and the first common electrode layer 40 are then manufactured through the PVD method.

At this time, a liquid electrolyte material or a gel electrolyte material can be coated on an upper surface of the patterned electrochromic layer 202. The ion storage layer 204 and the patterned electrochromic layer 202 are adhered to eventually obtain the pixelated electrochromic layer 20. In the pixelated electrochromic layer 20 that is manufactured through the fore-going method, the electrochromic layer 202 can also be made of inorganic electrochromic materials such as tungsten oxide ($WO_x$), and the ion storage layer 204 can also be made of metal oxide materials such as nickel oxide ($NiO_x$).

The display panel shown in FIG. 3 and the display panel shown in FIG. 4 are substantially similar in structure, and differences lie in that: in the embodiment shown in FIG. 3, the electrochromic layer 202 completely covers the first pixel electrode layer 304; as for the embodiment shown in FIG. 4, the patterned electrochromic layer 202 only completely covers the second pixel electrode layer 308 and does not cover the portion of the second planarization layer 307 that is exposed. Therefore, in the embodiment shown in FIG. 4, the ion transport layer 203 covers the portion of the second planarization layer 307 that is exposed, in instead of the patterned electrochromic layer 202 covers the portion of the second planarization layer 307 that is exposed.

It is precisely because of subtle differences between the display panel embodiments shown in FIG. 3 and FIG. 4 that processes of manufacturing the display panels are also different. On one hand, or the embodiment shown in FIG. 3, after the first pixel electrode layer 304 is manufactured, the electrochromic layer 202, the ion transport layer 203, and the ion storage layer 204 are sequentially formed on the first pixel electrode layer 304 through the PVD method. The ion transport layer can be a solid electrolyte material, and the electrochromic layer 202 completely covers the first pixel electrode layer 304 and the portion of the first planarization layer 303 that is exposed.

On the other hand, for the embodiment shown in FIG. 4, after the second pixel electrode layer 308 and the patterned electrochromic layer 202 above the second pixel electrode layer 308 are manufactured, the PVD method is required to be utilized to separately form the ion storage layer 204 and the first common electrode layer 40 that are stackedly arranged. Finally, a liquid electrolyte material or a gel electrolyte material is coated on the patterned electrochromic layer 202, and the patterned electrochromic layer 202 and the ion storage layer 204 are adhered, and then the pixelated electrochromic layer 20 is eventually obtained. In the embodiment shown in FIG. 4, the ion transport layer 203 is a liquid electrolyte material or a gel electrolyte material.

Compared with the ion transport layer 203 made of a solid electrolyte material, the ion transport layer 203 made of a liquid electrolyte material or a gel electrolyte material has a faster ion transport rate, which can effectively enhance a rate of the display panel switching between the transparent state, the black state, and different display states. At the same time, since the electrochromic layer 202 in the embodiment shown in FIG. 4 is patterned, a size of the patterned electrochromic layer 202 is same as a size of the second pixel electrode layer 308. After power is applied to the second pixel electrode layer 308, an outward diffusion of switched regions having color changes of the electrochromic layer 202 are also greatly reduced.

Figure 5:
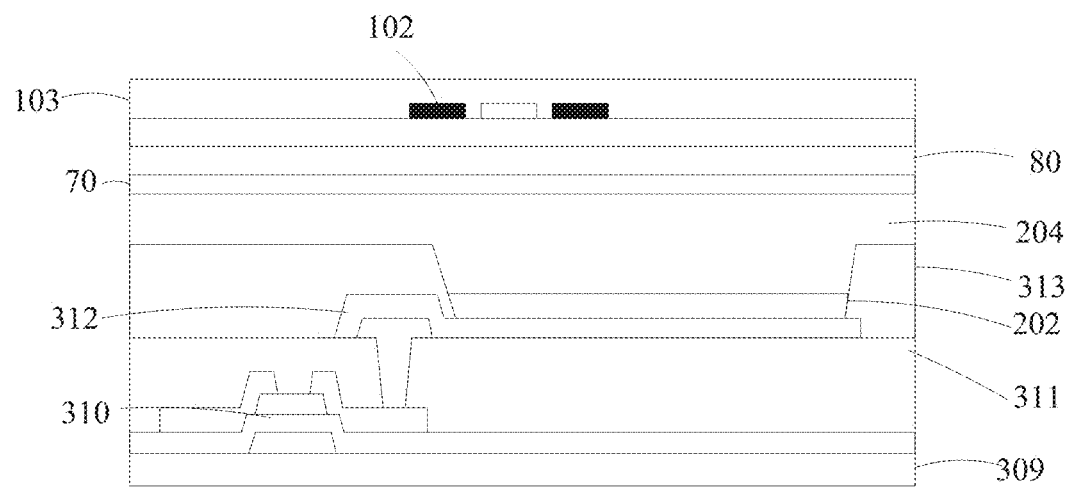
FIG. 5 is a structural schematic view of a display device provided by still another embodiment of the present application.

In the above embodiments, the materials of the electrochromic layer 202 are all inorganic electrochromic materials. In other embodiments, the electrochromic layer 202 can also be made of organic electrochromic materials. FIG. 5 is a structural schematic view of a display device provided by still another embodiment of the present application. As shown in FIG. 5, the electrochromic layer 202 is made of an organic polymer electrochromic material, specifically, polythiophene, polyaniline, polypyrrole, etc. During manufacturing, the electrochromic layer 202 can be manufactured through vapor deposition or inkjet printing directly on a thin-film transistor layer.

For the pixelated electrochromic layer 20 made of organic electrochromic materials, the ion storage layer 204 is not necessary. Referring to FIG. 5, the display panel shown in FIG. 5 still includes the transparent pixel layer 10 and the pixelated electrochromic layer 20. The pixelated electrochromic layer 20 can include a fourth transparent substrate 309, a third thin-film transistor 310, a third planarization layer 311, and a third pixel electrode layer 312 stacked from bottom to top. The third pixel electrode layer 312 is provided above the third planarization layer 311, and the third pixel electrode layer 312 only partially covers the third planarization layer 311.

A photoresist layer 313 is further disposed above the third pixel electrode layer 312, the photoresist layer 313 covers a portion of the third pixel electrode layer 312, and the photoresist layer 313 is formed with an opening above the third pixel electrode layer 312 to expose a portion of the third pixel electrode layer 312.

In the embodiment shown in FIG. 5, the pixelated electrochromic layer 20 includes the organic electrochromic layer 202 and the ion transport layer 203. The organic electrochromic layer 202 is filled in the opening on the photoresist layer 313, the ion transport layer 203 is disposed above the organic electrochromic layer 202, and the ion transport layer 203 completely covers the organic electrochromic layer 202 and the photoresist layer 313.

The second common electrode layer 70 is still disposed above the ion transport layer 203, and the fifth transparent substrate 80 is disposed above the second common electrode layer 70. The fourth transparent substrate 309, the third thin-film transistor 310, the third planarization layer 311, the third pixel electrode layer 312, and the photoresist layer 313 together form a lower substrate; while the second common electrode layer 70 and the fifth transparent substrate 80 together form the upper substrate. When manufacturing the display panel, firstly, the upper substrate and the lower substrate are respectively manufactured by thin-film transistor manufacturing processes; then, organic electrochromic material is deposited in the opening on the photoresist layer 313 by an evaporation process or an inkjet printing process to form the organic electrochromic layer 202; and finally, a liquid electrolyte material or gel electrolyte material is coated over the photoresist layer 313 and over the organic electrochromic layer 202 in the opening, and the electrolyte material is attached to the upper substrate through vacuum bonding technology to achieve adhering of the upper substrate and the lower substrate, so as to manufacture the display panel.

It should be noted that the display panel manufactured in the embodiments of the present application are transparent display panels, so that substrates and other film layer structures in the embodiments of the present application are all transparent, which facilitates light to pass therethrough.

An embodiment of the present application further provides a display device, the display device includes the display panel described in any one of the embodiments above, as for details, please refer to foregoing contents, which will not be reiterated herein.

In the above embodiments, the descriptions of the various embodiments are different in emphases, for contents not described in detail, please refer to related description of other embodiments, and will not be reiterated herein.

In practical, the above units or structures can be implemented as independent entities, or can be arbitrarily combined to be implemented as the same or several entities. For specific implementations of the above units or structures, references can be made to the foregoing embodiments, and will not be reiterated herein.

For specific implementations of the above operations, references can be made to the foregoing embodiments, and will not be reiterated herein.

The display panel and the display device provided by the present application are described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. A display panel, comprising:
   a transparent pixel layer comprising a plurality of pixel light-emitting regions; and
   a pixelated electrochromic layer is disposed under the transparent pixel layer, wherein the pixelated electrochromic layer comprises a plurality of electrochromic regions, and wherein the plurality of pixel light-emitting regions and the plurality of electrochromic regions are arranged in one-to-one correspondences;
   wherein each of the plurality of pixel light-emitting regions comprises a plurality of transparent pixels of different colors for emitting light towards a side of transparent pixel layer away from the pixelated electrochromic layer,
   wherein at least one of the plurality of electrochromic regions is capable of being switched between a transparent state and a black state to allow each of the plurality of transparent pixels to capable of being black display while blocking incident ambient light from a side of the pixelated electrochromic layer away from the transparent pixel layer.

2. The display panel according to claim 1, wherein when any one of the plurality of electrochromic regions serves as a target electrochromic region, an orthographic projection area of the target electrochromic region on the transparent pixel layer is greater than or equal to an area of a target pixel light-emitting region corresponding to the target electrochromic region.

3. The display panel according to claim 2, wherein the target pixel light-emitting region comprises a target transparent pixel region and a target transparent opening region, and the orthographic projection area of the target electrochromic region on the transparent pixel layer is greater than or equal to an area of the target transparent pixel region and the target transparent opening region.

4. The display panel according to claim 1, wherein a distance in a horizontal direction between any two adjacent pixel light-emitting regions of the plurality of pixel light-emitting regions is greater than or equal to 20 micrometers.

5. A display device comprising the display panel according to claim 1.

6. A display panel, comprising:
   a transparent pixel layer comprising a plurality of pixel light-emitting regions; and
   a pixelated electrochromic layer is disposed under the transparent pixel layer, wherein the pixelated electrochromic layer comprises a plurality of electrochromic regions, and wherein the plurality of pixel light-emitting regions and the plurality of electrochromic regions are arranged in one-to-one correspondences;
   wherein at least one of the plurality of electrochromic regions is capable of being switched between a transparent state and a black state,
   wherein the pixelated electrochromic layer comprises an electrochromic layer, an ion transport layer, and an ion storage layer that are stackedly arranged, and
   wherein the ion transport layer is configured for transporting ions and blocking electrons from passing through.

7. The display panel according to claim 6, wherein the pixelated electrochromic layer further comprises a first transparent substrate, a first thin-film transistor layer, a first planarization layer, and a first pixel electrode that are stackedly arranged;
   wherein the first pixel electrode layer is disposed under the electrochromic layer, the first pixel electrode layer partially covers the first planarization layer, and the electrochromic layer completely covers the first pixel electrode layer and covers a portion of the first planarization layer.

8. The display panel according to claim 7, wherein the ion transport layer is made of solid electrolyte material.

9. The display panel according to claim 6, wherein the pixelated electrochromic layer further comprises a second transparent substrate, a second thin-film transistor layer, a second planarization layer, and a second pixel electrode layer that are stackedly arranged;
   wherein the second pixel electrode layer is disposed under the electrochromic layer, and the second pixel electrode layer partially covers the second planarization layer; the electrochromic layer is a patterned electrochromic layer, and the patterned electrochromic layer completely covers the second pixel electrode layer;
   wherein the ion transport layer completely covers the electrochromic layer and partially covers the second planarization layer; the ion transport layer is capable of transporting ions and blocking electrons from passing through.

10. The display panel according to claim 9, wherein the ion transport layer is a liquid electrolyte material or a gel electrolyte material.

11. The display panel according to claim 7, wherein the electrochromic layer is made of an inorganic electrochromic material.

12. The display panel according to claim 11, wherein the electrochromic layer is made of tungsten oxide.

13. The display panel according to claim 7, wherein the ion storage layer is made of metal oxide.

14. The display panel according to claim 7, further comprising a first common electrode layer, an interlayer, and a third transparent substrate that stackedly arranged; wherein the first common electrode layer is arranged above the ion storage layer, and the third transparent substrate is connected to the first common electrode layer through the interlayer.

15. A display panel, comprising:
  a transparent pixel layer comprising a plurality of pixel light-emitting regions; and
  a pixelated electrochromic layer is disposed under the transparent pixel layer, wherein the pixelated electrochromic layer comprises a plurality of electrochromic regions, and wherein the plurality of pixel light-emitting regions and the plurality of electrochromic regions are arranged in one-to-one correspondences;
  wherein at least one of the plurality of electrochromic regions is capable of being switched between a transparent state and a black state,
  wherein when any one of the plurality of electrochromic regions serves as a target electrochromic region, an orthographic projection area of the target electrochromic region on the transparent pixel layer is greater than or equal to an area of a target pixel light-emitting region corresponding to the target electrochromic region,
  wherein the pixelated electrochromic layer comprises a fourth transparent substrate, a third thin-film transistor layer, a third planarization layer, and a third pixel electrode layer that are stackedly arranged,
  wherein the third pixel electrode layer is disposed above the third planarization layer, and the third pixel electrode layer partially covers the third planarization layer, and
  wherein the display panel further comprises a photoresist layer, the photoresist layer is disposed above the third pixel electrode layer and covers a portion of the third pixel electrode layer, and the photoresist layer is defined with an opening above the third pixel electrode layer to expose a portion of the third pixel electrode layer.

16. The display panel according to claim 15, wherein the electrochromic layer is made of an organic electrochromic material.

17. The display panel according to claim 16, wherein the electrochromic layer is made of polythiophene, polyaniline, or polypyrrole.

18. The display panel according to claim 15, wherein the pixelated electrochromic layer further comprises an organic electrochromic layer and an ion transport layer, the organic electrochromic layer is filled in the opening on the photoresist layer, the ion transport layer is disposed above the organic electrochromic layer, and the ion transport layer completely covers the organic electrochromic layer and the photoresist layer.

19. The display panel according to claim 18, wherein the display panel further comprises a second common electrode layer disposed above the ion transport layer, and a fifth transparent substrate disposed above the second common electrode layer.

* * * * *